Feb. 24, 1925.
E. CHARTON
1,527,839
DEVICE FOR SETTING OR HEADING FOWLING CARTRIDGES
Filed Aug. 27, 1923
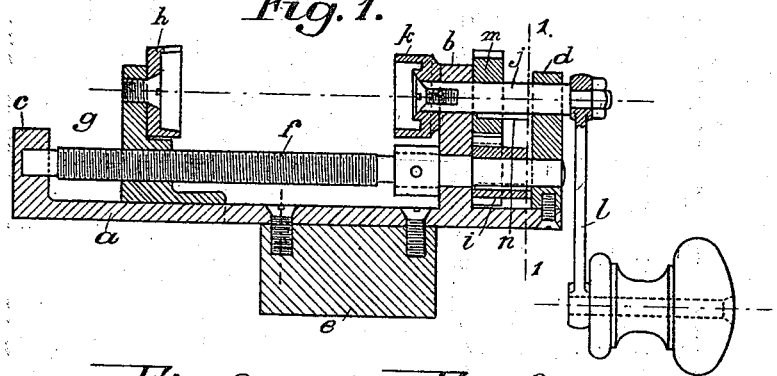
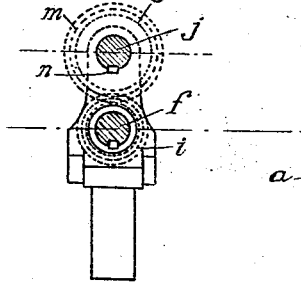
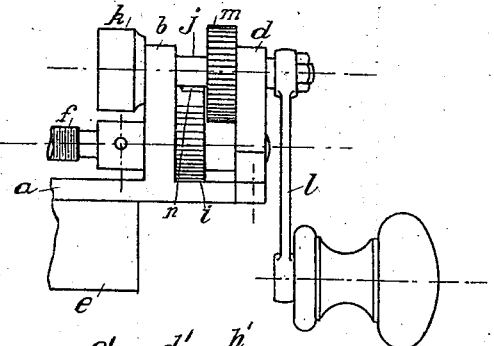
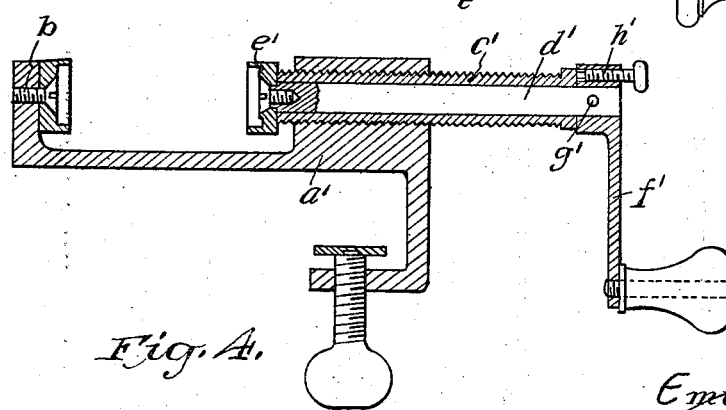
Inventor:
Emile Charton.
Attorney.

Patented Feb. 24, 1925.

1,527,839

UNITED STATES PATENT OFFICE.

EMILE CHARTON, OF ST. CHAMOND, FRANCE.

DEVICE FOR SETTING OR HEADING FOWLING CARTRIDGES.

Application filed August 27, 1923. Serial No. 659,662.

*To all whom it may concern:*

Be it known that I, EMILE CHARTON, a citizen of the French Republic, and resident of St. Chamond, Loire, France, have invented certain new and useful Improvements in Devices for Setting or Heading Fowling Cartridges, of which the following is a specification.

In order to obtain the best results from cartridges, it is necessary that the setting or heading thereof is made with the greatest care. By the use of the device forming the subject of my present invention, I obtain a perfect and absolutely regular setting or heading in that it will be effected under constant strain in a plane exactly parallel to the plane of the cartridge-bottom, the device having no lever.

In the following description is disclosed one preferred form of construction of the setting device, reference being had to the accompanying drawings, wherein:

Fig. 1 is a sectional front elevation of the device the section being made on a central longitudinal plane.

Fig. 2 is a cross section on line 1—1 of Fig. 1.

Fig. 3 is a front elevation of that part of the device comprising the gear-wheels and Fig. 4 is a view similar to Fig. 1 showing a modified form of construction.

Referring to Figs. 1 to 3, the frame supporting the various parts of the device is formed of a base-plate $a$ with which brackets or bearings $b$, $c$ may be made integral or suitably connected, a further bracket or bearing $d$ being removably secured onto the end of the base plate to permit of the parts being easily removed and replaced. Secured on the plate $a$ by means of screws is a block $e$ whereby the device may be held in a vice for instance for manufacturing cartridges. However if for the same purpose it is desired to place the device upon a table, it will be easy to substitute a clasp of the usual type (Fig. 4) for the said block $e$.

A screw-threaded shaft or spindle $f$ journaled in the bearings $b$, $c$, $d$, serves to cause a nut $g$ to travel over the plate $a$ serving as a guide, said nut carrying a cone-shaped part $h$ for the reception of the bottom end of a cartridge to be set. Keyed on the shaft $f$ between the bearings $b$ and $d$ is a gear-wheel $i$.

A shaft $j$ one end of which carries the smoothing member $k$ and the opposite end carrying a crank $l$, is journaled in said bearings $b$ and $d$, so that the axis thereof which must be located in the same plane as the axis of the cone $h$, will be exactly parallel to the axis of the shaft $f$. Mounted on said shaft $j$ is a gear-wheel $m$ meshing with the gear-wheel $i$, said gear-wheel $m$ being arranged to slide along a feather $n$ on the shaft $j$.

Fig. 1 shows the arrangements of the parts, the device being ready for operation. It will be seen that by actuating the crank the nut $g$ will move the cartridge nearer to the smoothing member $k$ and setting will thus be effected until the operator considers the resistance opposed to the rotation of the crank as being sufficient. At this moment the wheel $m$ will be disengaged from the wheel $i$ (Fig. 3) and a number of revolutions will be imparted to the crank with the result that the rim of the cartridge-case will be perfectly smoothed. Now the wheel $m$ will again be brought into mesh with the wheel $i$ (Fig. 1) and the crank will be rotated in opposite direction, whereby the nut $g$ will be moved apart from the smoothing member to enable the cartridge to be removed.

Equal constant and regular setting may be obtained by the modified device shown in Fig. 4, having also but a single crank and no lever.

The base plate $a'$ having a clasp forms the frame of the device. On one end thereof is secured a cone $b'$ serving to receive and hold the bottom end of a cartridge to be set; through the opposite end extends a screw-threaded sleeve $c'$, containing a shaft $d'$, one end of which carries a smoothing member $e'$, whilst the opposite end thereof carries a crank $f'$ attached to the shaft by means of a cross pin $g'$.

If desired the movement of said crank may also be imparted to the sleeve $c'$ through the agency of the needle $h'$.

It will be seen that by actuating the crank with the needle $h'$ engaging the sleeve $c'$, the smoothing member $e'$ will be moved nearer to the cone $b'$ and setting will thus be effected until the operator deems it sufficient. At this moment, he disengages the needle $h'$ from the sleeve $c'$ and imparts a number of revolutions to the crank with the result that the rim of the cartridge case will be perfectly smoothed thereby. Now the needle $h'$ will again be brought into engagement with the sleeve $c'$ and the crank will be rotated in opposite direction, whereby the smoothing member $e'$ will be moved apart from the cone $b'$ and the cartridge enabled to be removed.

Having now fully described my said invention, what I claim and desire to secure by Letters Patent, is:

1. In a setting or heading device for fowling cartridges, an element to receive the cartridge, a working element to cooperate with the cartridge, means for imparting combined rotary and endwise relative movements of the working element and receiving element for folding the edge of the cartridge, said means being adjustable to permit a relative rotary movement of said receiving element and working element without relative endwise movements thereof.

2. In a setting or heading device for fowling cartridges, the combination with a base-plate, of a movable cartridge holder arranged on said base plate, means for imparting straight forward and backward movements to said cartridge-holder, a rotary smoothing member also arranged on said base-plate in line with the cartridge holder and adapted to engage the free end of a cartridge held in said cartridge-holder, said smoothing member receiving its rotary movement from the means actuating the cartridge-holders, substantially as set forth.

3. In a setting or heading device for fowling cartridges, the combination with a base plate, of a cartridge-holder in the shape of a screw-nut, a screw-threaded shaft journaled on said base-plate and engaging said cartridge-holder, a gear-wheel on one end of said screw-threaded shaft, a second shaft journaled above the first mentioned shaft and parallel to the same, a smoothing member on one end of said second shaft in line with the cartridge-holder, a gear-wheel feathered on said second shaft and adapted to be brought into and out of mesh with the gear-wheel on the first mentioned shaft, and an operating crank keyed on said second shaft, substantially as set forth.

In testimony whereof I have hereunto set my hand in presence of two witnesses.

EMILE CHARTON. [L. S.]

Witnesses:
P. MASSARD,
F. B. MORIARTY.